United States Patent
Barvosa-Carter et al.

(10) Patent No.: US 7,267,367 B2
(45) Date of Patent: Sep. 11, 2007

(54) REVERSIBLY EXPANDABLE ENERGY ABSORBING ASSEMBLY UTILIZING SHAPE MEMORY FOAMS FOR IMPACT MANAGEMENT AND METHODS FOR OPERATING THE SAME

(75) Inventors: William Barvosa-Carter, Ventura, CA (US); Nancy L. Johnson, Northville, MI (US); Alan L. Browne, Grosse Pointe, MI (US); Guillermo A. Herrera, Winnetka, CA (US); Geoffrey P. Mc Knight, Los Angeles, CA (US); Cameron Massey, Hawthorne, CA (US)

(73) Assignee: General Motors Corporation, Detroit, MI (US)

( * ) Notice: Subject to any disclaimer, the term of this patent is extended or adjusted under 35 U.S.C. 154(b) by 627 days.

(21) Appl. No.: 10/815,332

(22) Filed: Apr. 1, 2004

(65) Prior Publication Data

US 2005/0217767 A1    Oct. 6, 2005

(51) Int. Cl.
*B60R 21/04* (2006.01)
(52) U.S. Cl. .................. 280/753; 296/187.05; 188/372
(58) Field of Classification Search ................ 280/751, 280/752, 753; 188/372; 180/271, 282
See application file for complete search history.

(56) References Cited

U.S. PATENT DOCUMENTS

| | | |
|---|---|---|
| 5,049,591 A | 9/1991 | Hayashi et al. |
| 5,145,935 A | 9/1992 | Hayashi |
| 5,370,925 A | 12/1994 | Koseki |
| 5,506,300 A | 4/1996 | Ward et al. |
| 5,727,391 A | 3/1998 | Hayward et al. ............. 60/528 |
| 5,752,716 A | 5/1998 | Fukawatase et al. |
| 5,794,975 A | 8/1998 | Nohr et al. |
| 5,925,084 A | 7/1999 | Gotoh et al. |
| 6,196,576 B1 | 3/2001 | Sutherland et al. |
| 6,224,090 B1 | 5/2001 | Lutze et al. |
| 6,467,987 B1 | 10/2002 | Larsen et al. |
| 6,550,341 B2 | 4/2003 | van Shoor et al. |
| 6,605,111 B2 | 8/2003 | Bose et al. |
| 6,620,287 B2 | 9/2003 | Cass |
| 6,627,275 B1 | 9/2003 | Chen |
| 6,663,821 B2 | 12/2003 | Seward |
| 6,910,714 B2 * | 6/2005 | Browne et al. ............. 280/753 |
| 7,140,478 B2 * | 11/2006 | Barvosa-Carter et al. ... 188/267 |
| 2002/0101008 A1 | 8/2002 | Sokolowski |

FOREIGN PATENT DOCUMENTS

| | | |
|---|---|---|
| JP | 4-76274 | 3/1992 |
| JP | 7-42893 | 2/1995 |
| WO | WO 03/101722 | 12/2003 |

\* cited by examiner

*Primary Examiner*—Paul N. Dickson
*Assistant Examiner*—Robert A. Coker
(74) *Attorney, Agent, or Firm*—Kathryn A. Marra

(57) ABSTRACT

A reversible energy absorbing assembly including a shape memory foam disposed within an interior region, wherein the shape memory foam is adapted to expand to an expanded configuration in response to fluid communication with a fluid source. The shape memory foam is a material selected from the group consisting of shape memory alloys and shape memory polymers. Once expanded, the assembly effectively absorbs kinetic energy of an object upon impact with the assembly. The shape memory foam can be thermally activated to restore the original configuration of the energy absorbing assembly. Methods of operating the energy absorbing assembly are also disclosed.

31 Claims, 4 Drawing Sheets

REVERSIBLY EXPANDABLE ENERGY ABSORBING ASSEMBLY UTILIZING SHAPE MEMORY FOAMS FOR IMPACT MANAGEMENT AND METHODS FOR OPERATING THE SAME

BACKGROUND

This disclosure relates to an energy absorbing assembly and more particularly, to a reversible energy absorbing assembly for impact management.

It is known in the prior art to provide various types of personal protection by the use of energy-absorbing devices, such as in helmets, vehicles, and the like. These products are generally designed to absorb a significant percentage of the energy from an impact. Within the vehicle, for example, various types of occupant protection devices may be employed for impact with structural body components such as door pillars, frames, headrails and the like. These components are typically made of steel tubing or steel channels that are welded together to form the structural cage or unitized body for the vehicle and may themselves absorb energy as the result of an impact. In addition, energy absorbers may also be placed over the door pillars, frames, headrails, and other parts of the vehicle to further protect the vehicle occupants during an impact event. Prior art approaches generally have used irreversibly crushable materials, such as metal, plastics or foams, irreversible air inflation devices, e.g. air bags and inflatable side curtains, rigid translation devices, e.g., extendable/retractable knee bolsters, and devices that can change the stroking forces, e.g., magnetorheological material based dampers.

BRIEF SUMMARY

Disclosed herein is an energy absorbing assembly, comprising a rigid support structure having at least one inlet; a flexible covering engaged with the rigid support structure to define an expandable interior region; a fluid source in fluid communication with the at least one inlet; and a shape memory foam disposed in the expandable interior region, wherein the shape memory foam is adapted to expand to an expanded configuration in response to the fluid communication with the fluid source.

An interior vehicle surface comprises an energy absorbing assembly comprising a rigid support structure having at least one inlet; a flexible covering engaged with the rigid support structure to define an expandable interior region; a fluid source in fluid communication with the at least one inlet; and a shape memory foam disposed in the expandable interior region, wherein the shape memory foam is adapted to expand to an expanded configuration in response to the fluid communication with the fluid source.

A method of operating an energy absorbing assembly comprises attaching the energy absorbing assembly to a rigid support structure, wherein the energy absorbing assembly comprises a flexible covering engaged with the rigid support structure to define an expandable interior region; a fluid source in fluid communication with the at least one inlet; and a shape memory foam disposed in the expandable interior region, wherein the shape memory foam is adapted to expand to an expanded configuration in response to the fluid communication with the fluid source; expanding the shape memory foam from a permanent shape to the expanded configuration with the fluid source at a temperature less than a transition temperature of the shape memory foam; and heating the shape memory foam above the transition temperature causing the shape memory foam to revert back to the permanent shape, wherein the permanent shape has a density greater than the expanded configuration.

In another embodiment, a method of operating an energy absorbing assembly comprises sensing an impact of an object; expanding a shape memory foam disposed within the vehicle interior surface from a trained shape to an expanded shape; absorbing the impact of the object with the expanded shape of the shape memory foam; and heating the shape memory foam above a transition temperature causing the shape memory foam to revert back to the trained shape, wherein the trained shape has a density greater than the expanded configuration.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein are reversible energy absorbing assemblies for use in vehicle interior impact management that can be rapidly deployed to an expanded configuration so as to absorb kinetic energy associated with impact of an occupant against an interior surface. Advantageously, the energy absorbing assemblies are reversible and utilize shape memory foams that undergo plastic deformation in the expanded configuration so as to provide absorption of impact energy. After deployment, the energy absorbing assembly can recover its pre-deployed configuration by thermally heating the shape memory foam. While these devices are shown primarily for use in vehicle interiors, it will also be appreciated that these devised could be application to vehicle exteriors, such as a vehicle hood for pedestrian impact, to other personal protection devices, such as helmets, vests, knee pads, and the like as well as to seat and handlebars of motorcycles, all terrain vehicles, bicycles, and the like.

Figure 1:
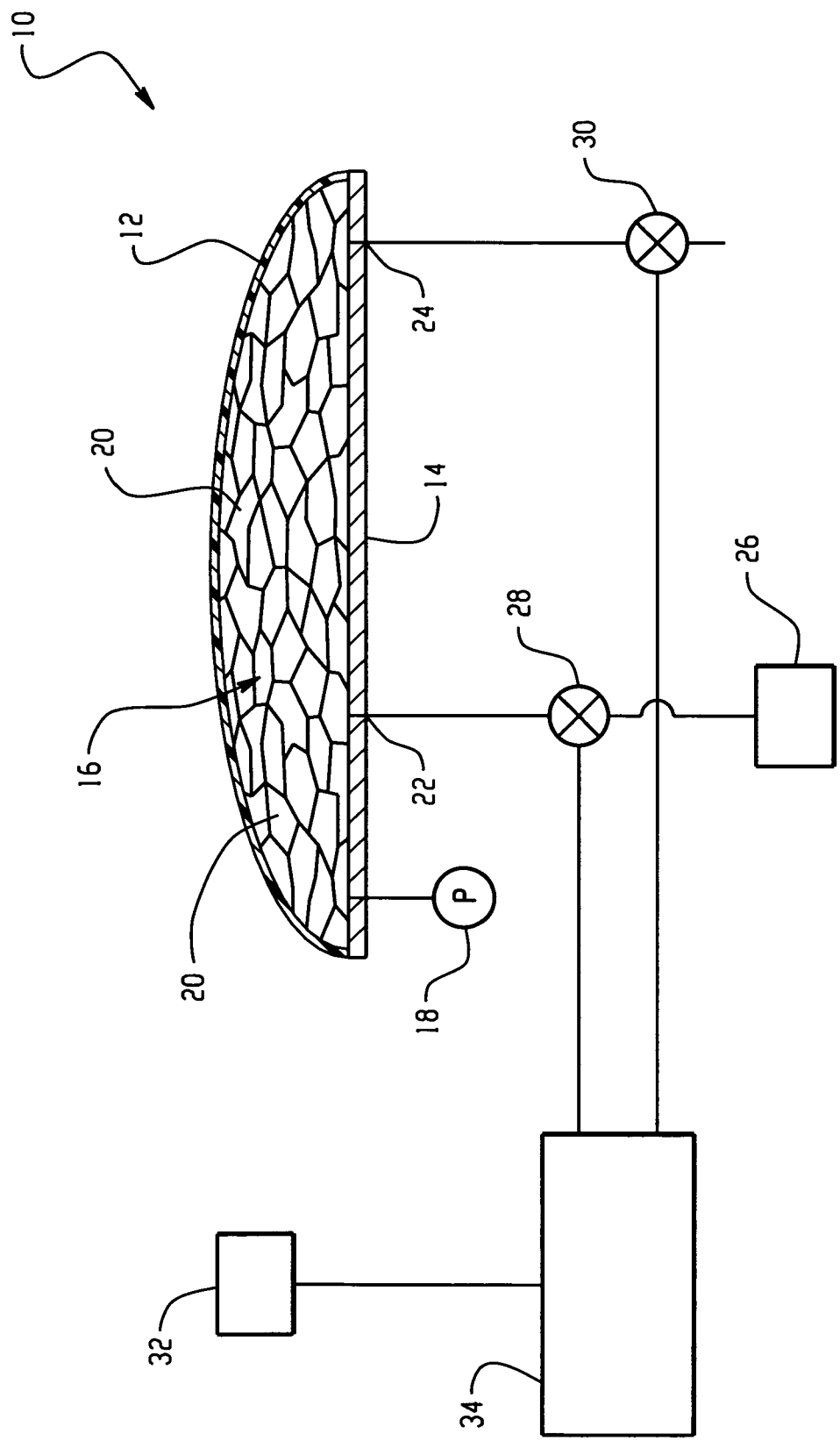
FIG. 1 is schematic illustrating an energy absorbing assembly in accordance with the present disclosure.
Figure 2:
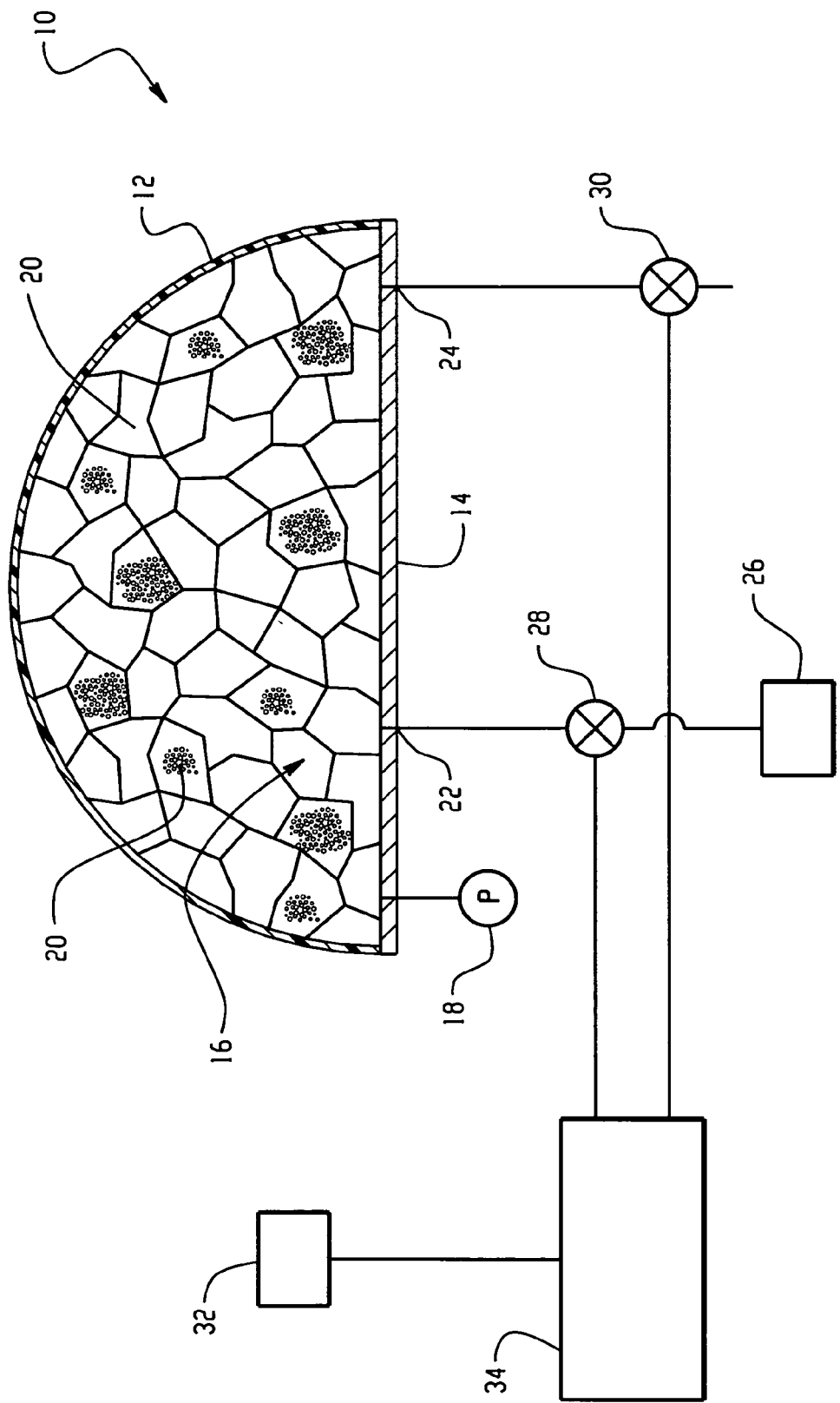
FIG. 2 is a side perspective view of a vehicle illustrating various support structures suitable for employing the energy absorbing assembly.

As shown in FIG. 1, an exemplary reversible energy absorbing assembly, generally indicated as 10, comprises a flexible covering 12 attached to a rigid support structure 14. The flexible covering 12 and the rigid support structure 14 define an expandable interior region 16. Open cell shape memory foam 20 is disposed within the expandable interior region 16. The rigid support structure 14 includes at least one inlet opening 22 and a fluid source 26 in fluid communication with the at least one inlet opening 22. The inlet opening 22 is in fluid communication with the open celled shape memory foam 20 such that fluid introduced into the at least one inlet opening 22 causes the foam to expand. The rigid support structure 14 may further include at least one outlet opening 24 for releasing the fluid within the expandable interior region 16. Alternatively, the flexible covering 12 is sufficiently porous so as to permit pressure relief caused by fluid expansion. Alternatively, disposed at the at least one inlet 22 and the at least one outlet 24 are valves 28, 30, respectively, for selectively introducing and discharging fluid from the interior region 16.

For impact energy management, it is preferred that the expansion time be relatively rapid. That is, the fluid source should concomitantly cause rapid expansion of the foam 20 within the interior region 16 and outward expansion of the flexible covering 12. In one embodiment, the energy absorbing assembly is configured to be fully expanded within about 20 milliseconds (msec) or less when utilized with a vehicle impact sensor. In another embodiment, such as in combination with a pre-impact sensor, the energy absorbing assembly is configured to be fully expanded within about 200 milliseconds (msec) or less. Preferably, the energy absorbing assembly provides a volume expansion greater than 50 percent, with a volume expansion greater than 100 percent more preferred, and a volume expansion of about 200 to about 400 percent even more preferred.

The energy absorbing assembly 10 further comprises at least one sensor 32 and a controller 34 in operative communication with the gas source 26 and the optional valves 28, 30 for selectively inflating the interior region 16 in response to an activation signal provided by the at least one sensor 32 to the controller 34.

The sensor 32 is preferably configured to provide pre-impact information to the controller 34, which then actuates the energy absorbing assembly 10 under pre-programmed conditions defined by an algorithm or the like. In this manner, the system 10 can be used to anticipate an event such as an impact with an object and provide absorption of the kinetic energy associated with an occupant within the vehicle as a result of the impact. In the event a subsequent impact is not realized, the energy absorbing assembly reverts back to its original shape and configuration by heating the shape memory foam 20 so as to discharge the fluid from the interior region. The illustrated energy absorbing assembly 10 is exemplary only and is not intended to be limited to any particular shape, size, configuration, or the like.

The flexible covering 12 is preferably fabricated from a material that is elastic (flexible) to the limits of the assembly expansion so that it can return to its original geometry. As such, suitable materials include elastomers such as styrene butadiene rubber, polyurethanes, polyisoprene, neoprene, chlorosulfonated polystyrenes, and the like. Other materials suitable for use as a flexible cover 12 will be apparent to those skilled in the art in view of this disclosure. Preferably, the material chosen for the flexible cover accommodates reversible strains of at least about 500%, with strains of about 200 to about 400 percent more preferred. The flexible covering 12 can be decoratively patterned or, optionally, an outer decorative covering (not shown) can be provided in sliding engagement over the flexible covering 12, e.g., a stretchable fabric or the like.

Figure 3:
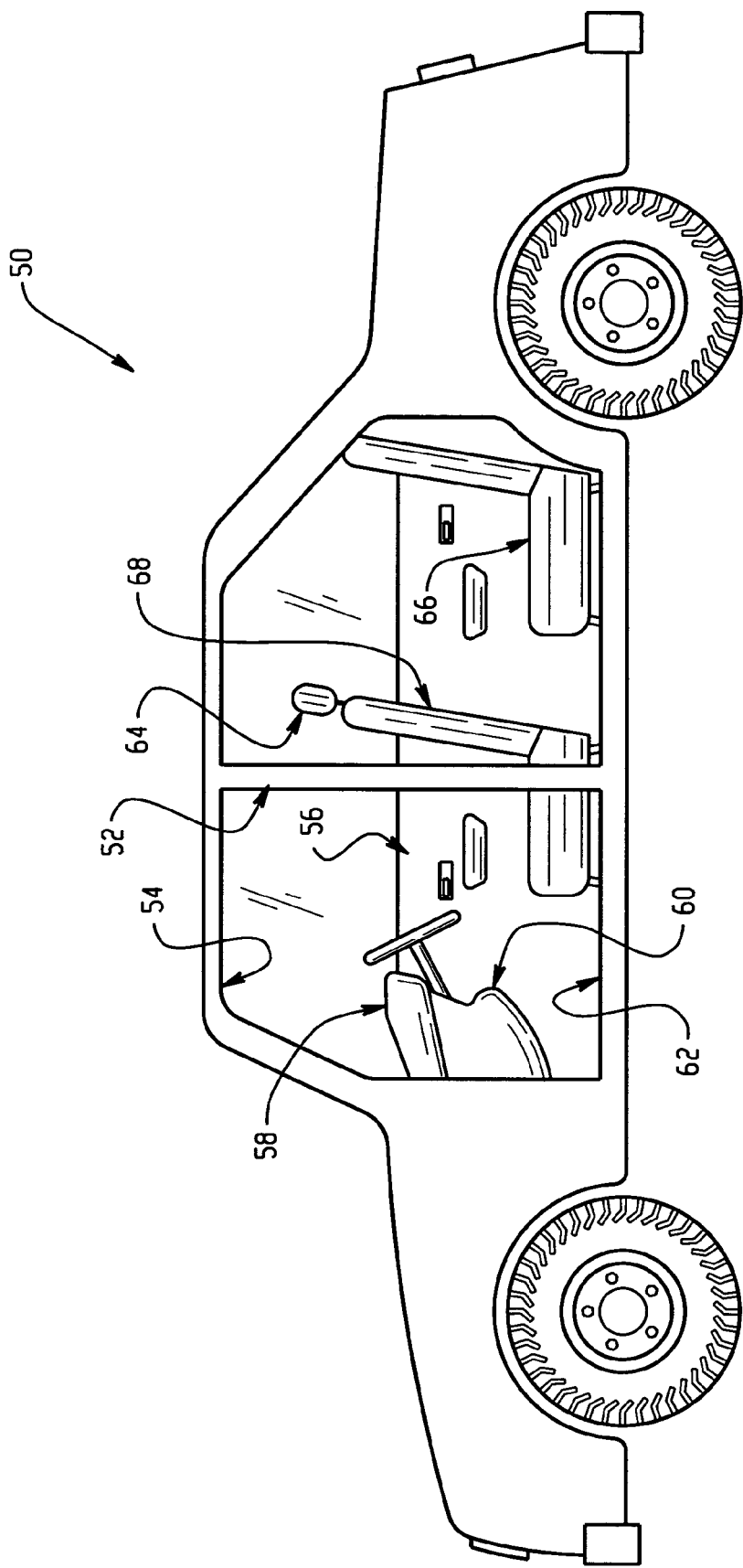
FIG. 3 is a side perspective view of a vehicle illustrating various support structures suitable for employing the energy absorbing assembly.

The rigid support structure 14 is preferably a stationary support for an interior surface of a vehicle. FIG. 3 illustrate various uses of the energy absorbing assembly 10 in a vehicle environment. The energy absorbing assembly 10 can be used to replace conventional padded interior surfaces in the vehicle 50 or any location that occupant protection may be desired. For example, the energy absorbing assembly 10 can be used for the door pillars 52, the header 54, the door interiors 56, the dashboard 58, the sun visors, the armrests, the knee bolsters 60, and other areas such as under the carpet on the vehicle floor 62, in the headrest 64 of the seat, the seat 66 itself, the seat backs 68, or like surfaces where absorption of kinetic energy caused by impact of an object with the surface is desired and/or proper positioning of an occupant is desired during an impact. For example, locating the energy absorbing assembly 10 under the carpet can be used to assist the positioning of an occupant's knees with respect to the knee bolster. In the seat area, the energy absorbing assembly can be strategically positioned to provide stiffening at an edge of the seat 66 to provide anti-submarining properties and help keep an occupant from sliding forward in the event of an impact. Other areas of the vehicle, such as the door pillars, can provide energy absorption properties to the occupant in the event of the impact, thereby decreasing the forces associated with an impact to the occupant.

Optionally, the expandable interior region 16 provided by the flexible covering 12 and the rigid structure 14 may comprise multiple sealed compartments, wherein each sealed compartment includes the fluid inlet in communication with a gas source as previously described as well as the shape memory foam material disposed therein. In this manner, the system advantageously provides redundancy, thereby preventing complete system failure due to puncture of one of the interior regions, malfunction of the valves, blockage, fatigue related failures, and other like failures.

Figure 4:
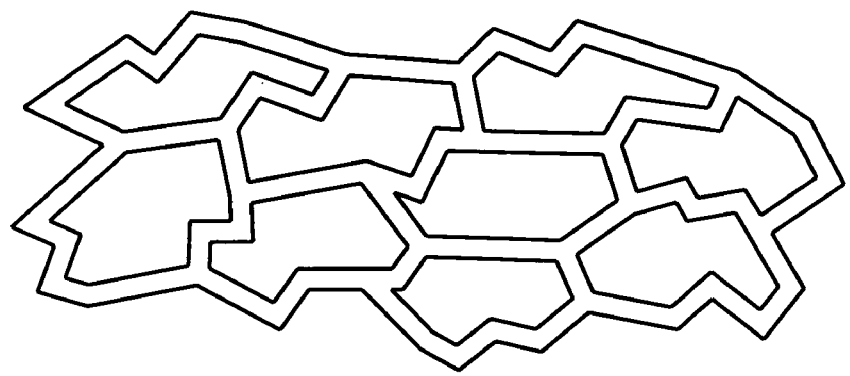
FIG. 4 illustrates a cross section taken along a plane of a shape memory foam in a trained or permanent configuration.
Figure 5:
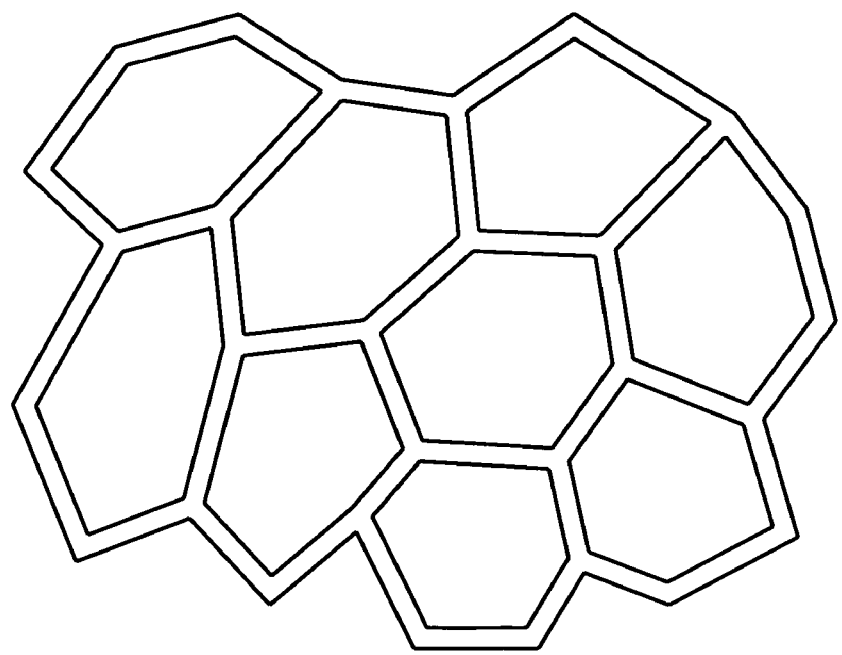
FIG. 5 illustrates a cross section of the shape memory foam of FIG. 4 in an expanded configuration.

The shape memory foam 20 is a material selected from the group consisting of shape memory polymers and shape memory alloys. In practice, the lowest thermodynamic energy state of the foam material is employed for forming the energy absorbing assembly, also referred to herein as the permanent shape or collapsed state. FIG. 4 illustrates the collapsed state. To facilitate rapid expansion, the foam is injected with high-pressure fluid to provide expansion of the foam. FIG. 5 illustrates the foam in its expanded state. It is important that the expansion take place below a critical transition temperature (Tc) for the particular shape memory material, which in the case of shape memory alloys, represents the martensite to austenite temperature transition, and in the case of shape memory polymers, represents the glass transition. In the process of expansion, the initially curved and folded "ligaments" of the foam material are straightened. If this occurs below Tc, then the shape transition will be metastable such that upon release of the fluid pressure, the foam will not collapse. Once expanded, the foam can effectively absorb impact energy. The primary impact absorption mechanism is the bending of the ligaments and collapse of the cellular structure, which can then be reused, if desired. A secondary impact absorption mechanism is provided by controlled venting of fluid out of the outlet. In this manner, the inflated structure can be used to provide additional energy absorption. In the event an impact event is not realized, heating above the Tc will reset the structure to its original configuration. A resistive heating element, a heated fluid source, or the like, disposed in thermal communication with the shape memory foam can be used to restore the original shape. Alternatively, some damage, such as from impact or from inadvertent dents dues to normal use, may also be repaired by this mechanism.

Shape memory polymers (SMPs) generally refer to a group of polymeric materials that demonstrate the ability to return to some previously defined shape when subjected to an appropriate thermal stimulus, e.g., from an expanded foam configuration to a compact foam configuration. Shape memory polymers are capable of undergoing phase transitions in which their shape orientation is altered as a function of temperature. Generally, SMPs are co-polymers comprised of at least two different units which may be described as defining different segments within the co-polymer, each segment contributing differently to the flexural modulus properties and thermal transition temperatures of the material. The term "segment" refers to a block, graft, or sequence of the same or similar monomer or oligomer units that are copolymerized with a different segment to form a continuous crosslinked interpenetrating network of these segments. These segments may be combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the SMP and the thermal transitions thereof. When multiple segments are used, multiple thermal transition temperatures may be observed, wherein the thermal transiton temperatures of the copolymer may be approximated as weighted averages of the thermal transiton temperatures of its comprising segments. The previously defined or permanent shape of the SMP can be set by blow molding the polymer at a temperature higher than the highest thermal transition temperature for the shape memory polymer or its melting point, followed by cooling below that thermal transition temperature. As previously disclosed, the foams formed from shape memory polymers are preferably open cell.

In practice, the SMP foams are alternated between one of at least two shape orientations such that at least one orientation will provide a size reduction relative to the other orientation(s) when an appropriate thermal signal is provided. To set a permanent shape, the shape memory polymer must be at about or above its melting point or highest transition temperature (also termed "last" transition temperature). The SMP foams are shaped at this temperature by blow molding or shaped with an applied force followed by cooling to set the permanent shape. The temperature necessary to set the permanent shape is generally between about 40° C. to about 300° C. After expansion by fluid, the permanent shape is regained when the applied force is removed, and the expanded SMP foam is again brought to or above the highest or last transition temperature of the SMP. The Tg of the SMP can be chosen for a particular application by modifying the structure and composition of the polymer. Transition temperatures of suitable SMPs generally range from about −63° C. to above about 160° C.

The temperature needed for permanent shape recovery can be set at any temperature between about −63° C. and about 160° C. or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

Suitable shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly (ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Conducting polymerization of different monomer segments with a blowing agent can be used to form the shape memory polymer foam. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N'-dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen gas, and the like. The material can then be reverted to the permanent shape by heating the material above its Tg but below the highest thermal transition temperature or melting point. Thus, by combining multiple soft segments it is possible to demonstrate multiple temporary shapes and with multiple hard segments it may be possible to demonstrate multiple permanent shapes.

As previously discussed, other suitable shape memory materials for fabricating the foams also include shape memory alloy compositions. Shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing properties, expansion of the shape memory alloy foam is preferably at or below the austenite transition temperature (at or below $A_s$). Subsequent heating above the austenite transition temperature causes the expanded shape memory foam to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials for fabricating the foams include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. A preferred shape memory alloy is a nickel-titanium based alloy commercially available under the trademark NITINOL from Shape Memory Applications, Inc. Selection of a suitable shape memory alloy composition depends on the temperature range where the component will operate.

The fluid source 26 may be stored in the vehicle as a gas in a compressed gas container or from an accumulator or generated pyrotechnically. Alternatively, the fluid source may be a liquid and may be injected into the shape memory foam causing expansion thereof. Suitable fluids include inert gases, air, water, and the like. Preferably, the fluid is nonflammable. The fluid source may be recharged after expansion of the assembly. For example, an on-board compressor may be employed. Alternatively, replacement of the fluid source may be made or a repair may be made to recharge the fluid source.

In operation, once a crash event or the imminence of a crash event has been detected by sensor 32, the fluid inlet pressure valve 28 is opened causing fluid to flow into the interior region 16 and concomitantly expand the flexible covering 12 and the shape memory foam 20, as indicated by the dotted line structure in FIG. 1. A pressure sensor 18 can be used to monitor the force of the deployment, which is fed back to the controller 34. Expansion continues until the backpressure within the interior region 16 reaches a predetermined pressure (preferably at about 20 to about 100 psi based upon a combination of sensor inputs and other types of event inputs such as, for example, inputs as to weight of occupant (child versus adult), whether occupant is restrained or unrestrained, and the like) at which time fluid flow into the interior region 16 is discontinued or pressure relief valve 30 opens to maintain the predetermined pressure. Alternatively, expansion may continue for a predetermined time so as to provide sufficient expansion.

The energy absorbing assembly 10 can be applied to any rigid support structure 14 wherein it is desired to provide a kinetic energy reduction associated with an occupant and/or object impacting the support structure and/or for proper positioning of an occupant. As such, the system is extremely versatile. Because of the short expansion times, this type of energy absorbing assembly is particularly well suited for use with crash detection systems using crash detection means plus algorithms to trigger deployment, i.e., systems similar to that used in conventional airbag restraint systems. Restoration of the device to it original geometry would have no such requirement for rapid action and thus could be effectively managed by thermal activation of the shape memory foam to its permanent or trained configuration such as is shown in FIG. 4.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An energy absorbing assembly, comprising:
 a rigid support structure having at least one inlet;
 a flexible covering engaged with the rigid support structure to define an expandable interior region;
 a fluid source in fluid communication with the at least one inlet; and
 a shape memory foam disposed in the expandable interior region, wherein the shape memory foam is adapted to expand to an expanded configuration in response to the fluid communication with the fluid source.

2. The energy absorbing assembly of claim 1, further comprising means for heating the shape memory foam in the expanded configuration.

3. The energy absorbing assembly of claim 1, further comprising a crash sensor and a pressure sensor in electrical communication with a controller, wherein the controller is in operative communication with the at least one inlet, and wherein the pressure sensor is adapted to monitor a pressure within the interior region.

4. The energy absorbing assembly of claim 1, wherein the shape memory foam is a material selected from the group consisting of a shape memory polymer and a shape memory alloy.

5. The energy absorbing assembly of claim 4, wherein the shape memory alloy comprises nickel-titanium based alloys, indium-titanium based alloys, nickel-aluminum based alloys, nickel-gallium based alloys, copper based alloys, gold-cadmium based alloys, iron-platinum based alloys, iron-palladium based alloys, silver-cadmium based alloys, indium-cadmium based alloys, manganese-copper based alloys, or combinations comprising at least one of the foregoing alloys.

6. The energy absorbing assembly of claim 4, wherein the shape memory polymer comprises polyphosphazenes, poly (vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, poly (methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate), polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, or copolymers thereof.

7. The energy absorbing assembly of claim 1, wherein the rigid support structure comprises a vehicle door pillar, a vehicle header, a vehicle door interior, a vehicle dashboard, a sun visor, an armrest, a vehicle knee bolster, a vehicle floor, a vehicle headrest, a vehicle seat, or a vehicle seat back.

8. The energy absorbing assembly of claim 1, wherein the flexible covering sealingly engaged with the rigid support structure defines multiple expandable interior regions, wherein each one of the multiple inflatable interior regions includes the at least one inlet and shape memory foam.

9. The energy absorbing assembly of claim 1, wherein the fluid source comprises a pressurized gas canister or an accumulator inflator or a pyrotechnic device.

10. The energy absorbing assembly of claim 1, wherein the fluid source comprises a gas or a liquid.

11. An interior vehicle surface comprising:
an energy absorbing assembly comprising a rigid support structure having at least one inlet; a flexible covering engaged with the rigid support structure to define an expandable interior region; a fluid source in fluid communication with the at least one inlet; and a shape memory foam disposed in the expandable interior region, wherein the shape memory foam is adapted to expand to an expanded configuration in response to the fluid communication with the fluid source.

12. The interior vehicle surface of claim 11, wherein the energy absorbing assembly forms a door pillar surface, a headrest surface, a floor surface, a seat surface, a dashboard surface, a steering wheel surface, a door surface, a ceiling surface, header, roof rail, center console, or a combination comprising at least one of the foregoing interior vehicle surfaces.

13. The interior vehicle surface of claim 12, wherein the shape memory foam is a material selected from the group consisting of a shape memory polymer and a shape memory alloy.

14. The energy absorbing assembly of claim 12, wherein the shape memory alloy comprises nickel-titanium based alloys, indium-titanium based alloys, nickel-aluminum based alloys, nickel-gallium based alloys, copper based alloys, gold-cadmium based alloys, iron -platinum based alloys, iron-palladium based alloys, silver-cadmium based alloys, indium-cadmium based alloys, manganese-copper based alloys, or combinations comprising at least one of the foregoing alloys.

15. The interior vehicle surface of claim 12, wherein the shape memory polymer comprises polyphosphazenes, poly (vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, poly (methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate), polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, or copolymers thereof.

16. A method of operating an energy absorbing assembly, comprising:
attaching the energy absorbing assembly to a rigid support structure, wherein the energy absorbing assembly comprises a flexible covering engaged with the rigid support structure to define an expandable interior region; a fluid source in fluid communication with the at least one inlet; and a shape memory foam disposed in the expandable interior region, wherein the shape memory foam is adapted to expand to an expanded configuration in response to the fluid communication with the fluid source;
expanding the shape memory foam from a permanent shape to the expanded configuration with the fluid source at a temperature less than a transition temperature of the shape memory foam; and
heating the shape memory foam above the transition temperature causing the shape memory foam to revert back to the permanent shape, wherein the permanent shape has a density greater than the expanded configuration.

17. The method of operating the energy absorbing assembly of claim 16, wherein the shape memory foam is a material selected from the group consisting of a shape memory polymer and a shape memory alloy.

18. The energy absorbing assembly of claim 17, wherein the shape memory alloy comprises nickel-titanium based alloys, indium-titanium based alloys, nickel-aluminum based alloys, nickel-gallium based alloys, copper based alloys, gold-cadmium based alloys, iron -platinum based alloys, iron-palladium based alloys, silver-cadmium based alloys, indium-cadmium based alloys, manganese-copper based alloys, or combinations comprising at least one of the foregoing alloys.

19. The energy absorbing assembly of claim 17, wherein expanding the shape memory foam from a permanent shape to the expanded configuration is at a temperature less than a martensite to austenite transition temperature for the shape memory alloy, and wherein heating the shape memory foam is at a temperature greater than the martensite to austenite transition temperature.

20. The method of operating the energy absorbing assembly of claim 17, wherein the shape memory polymer comprises polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate), polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbomyl-polyhedral oligomeric silsequioxane), polyvinylchloride, urethane/butadiene copolymers, polyurethane block copolymers, styrene-butadiene-styrene block copolymers, or copolymers thereof.

21. The method of operating the energy absorbing assembly of claim 20, wherein expanding the shape memory foam from a permanent shape to the expanded configuration is at a temperature less than a glass transition temperature for the shape memory polymer, and wherein heating the shape memory alloy is at a temperature greater than the glass transition temperature.

22. The method of operating the energy absorbing assembly of claim 16, further comprising cooling the shape memory foam to a temperature below the transition temperature causing the shape memory foam to revert back to a permanent shape from the expanded configuration.

23. The method of operating the energy absorbing assembly of claim 16, further comprising recharging the fluid source.

24. The method of operating the energy absorbing assembly of claim 23, further comprising cooling the shape memory foam to a temperature below the transition temperature causing the shape memory foam to revert back to the trained shape from the expanded shape.

25. A method of operating an energy absorbing assembly, comprising:
sensing an impact of an object;
expanding a shape memory foam disposed within the vehicle interior surface from a trained shape to an expanded shape;
absorbing the impact of the object with the expanded shape of the shape memory foam; and
heating the shape memory foam above a transition temperature causing the shape memory foam to revert back to the trained shape, wherein the trained shape has a density greater than the expanded configuration.

26. The method of operating the energy absorbing assembly of claim 25, wherein the shape memory foam is a material selected from the group consisting of a shape memory alloy and a shape memory polymer.

27. The method of operating the energy absorbing assembly of claim 26, wherein the shape memory alloy comprises nickel-titanium based alloys, indium-titanium based alloys, nickel-aluminum based alloys, nickel-gallium based alloys, copper based alloys, gold-cadmium based alloys, iron-platinum based alloys, iron-palladium palladium based alloys, silver-cadmium based alloys, indium-cadmium based alloys, manganese-copper based alloys, or combinations comprising at least one of the foregoing alloys.

28. The method of operating the energy absorbing assembly of claim 26, wherein the transition temperature comprises a martensite to austenite transition.

29. The method of operating the energy absorbing assembly of claim 26, wherein the shape memory polymer comprises polyphosphazenes, poly(vinyl alcohols), polyamindes, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate), polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbomyl-polyhedral oligomeric silsequioxane), polyvinylchloride, urethane/butadiene copolymers, polyurethane block copolymers, styrene-butadiene-styrene block copolymers, or copolymers thereof.

30. The method of operating the energy absorbing assembly of claim 29, wherein the transition temperature comprises a glass transition.

31. The method of operating the energy absorbing assembly of claim 25, further comprising recharging the fluid source.

\* \* \* \* \*